Feb. 27, 1968 A. F. SCHMECKENBECHER 3,370,979

MAGNETIC FILMS

Filed June 5, 1964

INVENTOR
ARNOLD F. SCHMECKENBECHER
BY

Edward W. Brown

ATTORNEY 3,370,979

MAGNETIC FILMS

Arnold F. Schmeckenbecher, Poughkeepsie, N.Y., assignor to International Business Machines Corporation, New York, N.Y., a corporation of New York Filed June 5, 1964, Ser. No. 372,979
4 Claims. (Cl. 117—217)

ABSTRACT OF THE DISCLOSURE

A method for producing a magnetic storage device consisting of two layers of magnetic material. Each layer has its easy access of remanent magnetization aligned substantially perpendicular to the other to enhance switching speed.

Alloys of nickel-iron-cobalt and nickel-iron-cobalt-phosphorous are electrolessly deposited upon a catalytic substrate from plating baths, as described herein, and under the influence of a magnetic field.

This invention relates to magnetic films and, more particularly, relates to stabilized ferromagnetic films and to the method of producing such films for application as storage and switching elements in data processing and computer machines.

Even though computers are now being constructed with ferrite core storage with cycle times as low as 15 microseconds, ferromagnetic films such as a 81 Ni–19 Fe alloy film have been intensively investigated in search for faster switching elements. These films, which hereafter will be referred to as storage films, attain uniaxial anisotropy when deposited onto a suitable substrate in the presence of an oriented magnetic field applied in the plane of the substrate surface. That is, a uniaxial anisotropic film is one which has easy and hard axes of magnetization. If the film is magnetized to one of its two remanent states along the easy axis, its magnetization can be switched to the other remanent state by either incoherent rotation or coherent rotation. Coherent rotation produces switching speeds as low as 2 nanoseconds and it is the desired mode of switching.

While it is theoretically assumed that anisotropic ferromagnetic films have an uniform coercive force ($H_c$), i.e., one of the parameters which determines the switching mode, in actual films this is not so. Rather, ferromagnetic films have localized composition variations, structural imperfections, impurities, and isotropic stress caused by the substrate. Therefore, not only does the coercive force vary throughout the film, but there are so-called "hard areas" with coercive force substantially higher than the average coercive force of the film. Because of the high coercive force, it is believed that these "hard areas" are unaffected by the magnetic fields applied to switch the magnetization of the film and, hence, influence switching behavior of the film. For example, it has been found that the input current necessary to switch storage films having these "hard areas" varies each time the magnetization of the film is switched. That is, a 350 ma. (milliamperes) current might be sufficient to switch the film one time, but the next time a 450 ma. current could be required. Also, the slope of S curves (magnetic flux in maxwells vs. input current in milliamperes, obtained during switching of the film, are not steep which indicates that switching results from incoherent rotation rather than the more desirable and faster coherent rotation. Therefore, when this anisotropic ferromagnetic film is embodied as a storage and switching element, the element is not as stable and as reliable as the ferrite core and switches at speeds slower than those which are capable with coherent rotation.

It is an object of this invention to provide a solution for electrolessly depositing the novel alloy composition on a surface.

According to one aspect of the present invention, an anisotropic ferromagnetic biasing film is disposed adjacent a ferromagnetic storage film so as to apply a permanent magnetic bias to the storage film normal to its easy axis and of a strength sufficient to control the "hard areas" of the film during switching. The biasing film comprises a ferromagnetic material with a coercive force ($H_c$) higher than the storage film so as to be unaffected by the input currents applied during the normal switching operation of the storage film. Preferably, the storage film is a Ni-Fe alloy and the biasing film is a Ni-Fe-Co alloy, both of which are anisotropic materials.

The present invention also contemplates a continuous plating process, preferably electroless plating, in which the two ferromagnetic films are sequentially deposited on a nonmagnetic substrate.

Further, the present invention contemplates a

Ni-Fe-Co-P alloy for the biasing film, as well as an electroless plating solution for plating the Ni-Fe-Co-P alloy.

An important advantage of this invention is that the preferred combined thickness of the two ferromagnetic films is only 30,000 A. for a cylindrical film and only 3000 A. for a flat film.

The foregoing and other objects, features and advantages of the invention will be apparent from the following more particular description of preferred embodiments of the invention, as illustrated in the accompanying drawings.

Figures 1, 2:
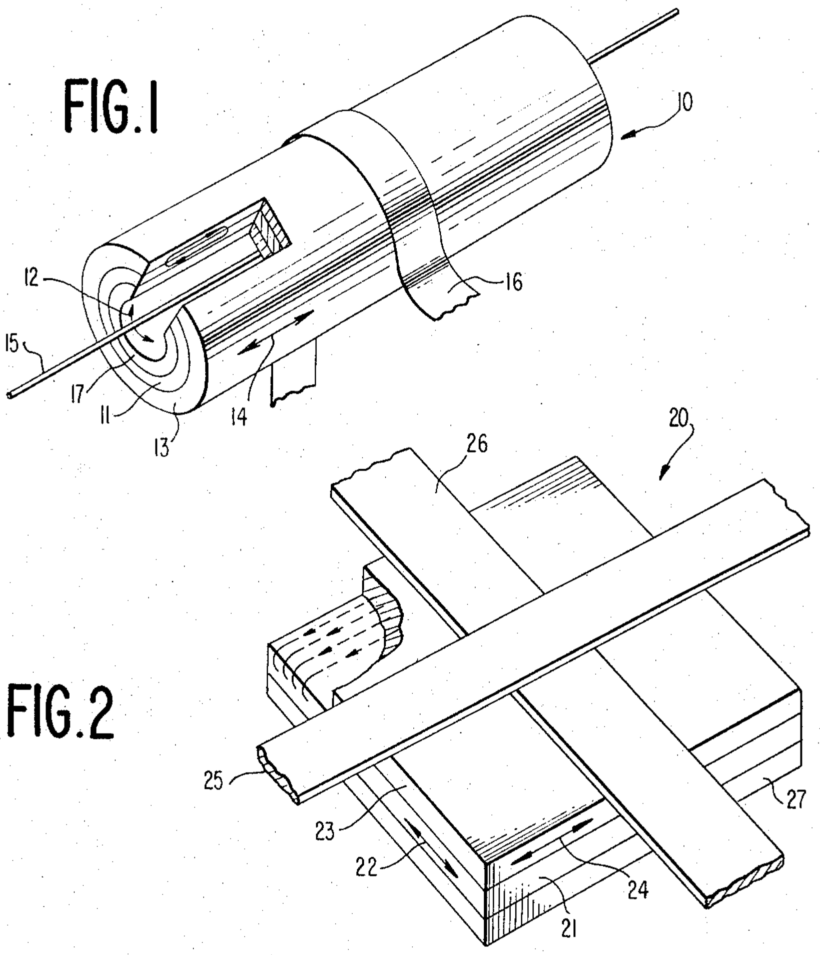
FIG. 1 is an isometirc view showing a biasing film disposed on a cylindrical ferromagnetic storage film, both of which have been partially cut away to show the flux path of the biasing film's permanent magnetic field.
FIG. 2 is an isometric view showing a biasing film disposed on a flat ferromagnetic storage film and partially cut away to show the flux path of the biasing film's permanent magnetic field.

Referring to the drawings in more detail, there is shown in FIG. 1 an embodiment of the ferromagnetic film 10 of the present invention. In this embodiment a cylindrical storage layer 11 with a low coercive force and having an easy axis in the direction indicated by the double headed arrow 12 is formed on a substrate 17, preferably glass. The layer 11 may be an alloy of the Permalloy family, that is, alloys which contain 15 to 45% iron and 55 to 85% nickel and which are capable of attaining uniaxial anisotropy. (It is to be understood that "percent" carries its normal meaning of percent by weight.) A preferred range within the Permalloy family for the storage layer 11, in which the alloys exhibit desirable magnetic characteristics, is one which contains 15–35% iron and 65–85% nickel. These alloys may also contain 0.25 to 2% phosphorous. Other ferromagnetic alloys which exhibit desirable magnetic characteristics are a 96.5 Co-3.5 Fe binary alloy and a 4 Mo-79 and Ni-17 Fe ternary alloy.

Most preferably, the storage layer 11 has a composition such that it exhibits substantially zero magnetostriction. Examples of compositions exhibiting this characterstic are 81 Ni-19 Fe alloy, 80.5 Ni-19 Fe-0.5 P alloy, and 4 Mo-79 Ni-17 Fe alloy. Of these three, the nickel-iron and the nickel-iron-phosphorous alloys are preferred. The storage layer 11 should have a low coercive force. Therefore, while the thickness of this layer can range from 1,000 to 40,000 A., a film thickness of 10,000 A. is preferred because the Ni-Fe alloys and the Ni-Fe-P alloys, in above preferred composition range, of this thickness have a coercive force of about 0.5 to about 4 oersteds, which is a desirable low coercive force range for the storage layer.

In accordance with the present invention, a permanent magnetic field is applied perpendicular to the easy axis 12 of storage layer 11 by a biasing ferromagnetic layer 13 disposed adjacent the layer 11 with its easy axis, as indicated by the double headed arrow 14, aligned perpendicular to the easy axis of the storage layer so as to stabilize the storage layer and enhance its switching speed. A permanent magnetic field of less than 0.2 $H_k$ produced by the biasing layer is sufficient to improve the magnetic characteristics of the storage layer. This biasing layer 13 must have a higher coercive force than the storage layer 11 so that it is unaffected by the normal switching of the magnetization states of the storage film. Depending of course, on the strength of magnetic field applied to switch the magnetization state of the storage layer, a biasing layer with a coercive force about 2 oersteds higher than the coercive force of the storage layer will be unaffected by the normal switching fields applied to the storage film. Preferably, the coercive force of biasing layer will be in the range of 2.5 to 20 oersteds.

While the biasing layer 13 is shown in FIG. 1 as the outer layer, this is not required and the biasing layer may serve as the inner layer. Also, while the storage layer 11 and biasing layer 13 could be separated by a slight distance, it is preferred that the two layers be in physical contact so as to provide a gap-free flux path. While many ferromagnetic alloys, such as nickel-cobalt, have a high coercive force and could be used for the biasing layer, it was found that an alloy of nickel-iron-cobalt with or without small amounts of interstitial atoms such as phosphorous, sulfur, nitrogen and carbon greatly improve the magnetic characteristics of the storage layer and, hence, is the most preferred ferromagnetic material for the biasing film. The composition of this alloy can range from 65–85% nickel, 1–20% iron, 1–20% cobalt, and up to 7% phosphorous. Because it is to have a higher coercive force than the storage layer, it is preferred that the biasing film be thicker than the storage film because coercivity is a function of thickness. Accordingly, the thickness of the biasing film can range from 5,000 to 80,000 A. with the preferred thickness being 20,000 A.

The ferromagnetic storage film 10 may be connected in a magnetic storage system in the conventional manner to use either the orthogonal mode or parallel mode of switching, Thus, in using the orthogonal mode as partially shown in FIG. 1, a bit line 15 extends through the cylindrical ferromagnetic film 10 in a direction normal to the easy axis of the storage layer 11. Also, a word line 16 is deposited over the cylindrical ferromagnetic film 10 and, herein, on the biasing layer 13. The line 16 is aligned substantially parallel with the easy axis of the storage layer 11. As mentioned previously, the two layers 11, 13 can be reversed so that the storage layer 11 is the outer layer. With this arrangement, the word line 15 then would be deposited on the layer 11. Conventional word and bit drivers can be used to drive the bit and word lines 15, 16 for applying coincident current pulses to switch the magnetization state of the storage layer 11 and store a ONE. Noncoincident pulses, of course, do not switch the magnetization state and store a ZERO.

Referring now in more detail to FIG. 2, the ferromagnetic film of the present invention is shown here embodied as a flat film 20. The film 20 comprises a storage layer 21 disposed between a substrate 27 and a biasing layer 23 and with its easy axis normal to the easy axis of the layer 23, as indicated by the double headed arrows 22, 24. The composition of these layers 21, 23 in the flat embodiment is the same as layers 11, 13 of cylindrical embodiment with the most preferred composition being Ni-Fe-P alloy for the storage layer 21 and Ni-Co-Fe-P for the biasing layer 23. Again, the preferred composition for the substrate 27 is glass. The only principal difference between these two embodiments is that the flat embodiment exhibits more desirable magnetic characteristics if the storage and biasing layers 21, 23 are not as thick as they are when employed in the cylindrical embodiment of FIG. 1. Therefore, the storage and biasing layers 21, 23 of the flat embodiment of FIG. 2 preferably are about 1,000 A. and 2,000 A. thick, respectively. Again, to employ the conventional orthogonal mode of switching a word line 26, as partially shown in FIG. 2, is deposited on the biasing layer 23 perpendicular to its easy axis. Also, as partially shown in FIG. 2, a bit line 25 is deposited on the word line 26 normal thereto. A layer of insulation (not shown), for example silicon monoxide, is interposed between the two lines 25, 26. Conventional drivers can be used and the operation of the flat ferromagnetic film 20 is the same as recited above for the cylindrical ferromagnetic film 10 shown in FIG. 1.

Both the cylindrical film 10 of FIG. 1 and the flat film 20 of FIG. 2 have been cut away to show the magnetic flux path of the permanent correcting magnetic bias of the present invention. It will be noted that this flux path lies in the hard direction (i.e., perpendicular to the easy axis) of the storage layer 11 (FIG. 1), 21 (FIG. 2). Thus, the permanent magnetic field of the biasing layer 13 (FIG. 1), 23 (FIG. 2) adds onto the magnetic field generated by a pulse on the word line 16 (FIG. 1), 26 (FIG. 2) to assist in switching the magnetization state of the storage layer when the bit line 15 (FIG. 1), 26 (FIG. 2) is pulsed coincidently.

Figure 3:
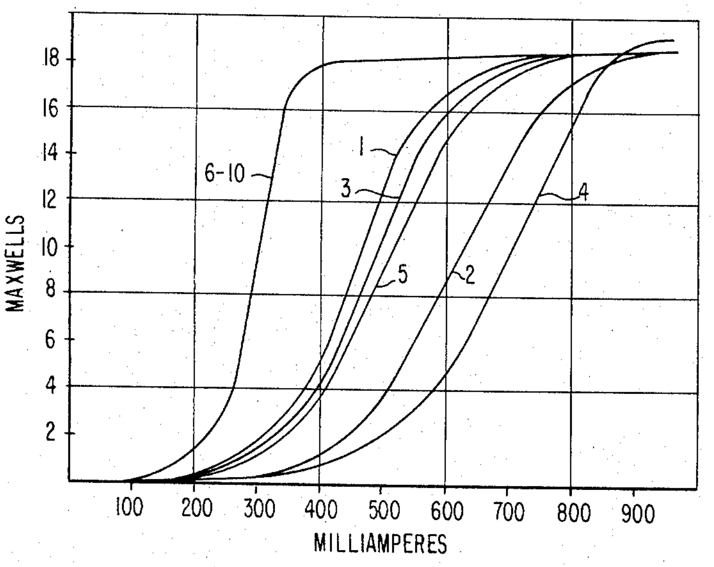
FIG. 3 is a graphical representation in the form of S-curves to display the magnetic characteristics of a ferromagnetic film with and without a biasing layer.

In addition, the "hard areas" of the storage layer are constantly under the influence of this permanent correcting magnetic field so that this layer is in the same stable state each time coincident pulses are received to switch its magnetization state. Accordingly, the number of milliamperes of current required to switch the magnetization state essentially is the same for each switching. In support of this statement, reference is now made to the S-curves of FIG. 3. Curves 1 to 5 were plotted during five switchings of a cylindrical 10,000 A. thick Ni-Fe-P storage film, (the same film which is used as the storage layer 11 in the present invention) *but* without a biasing layer 13 present to provide a permanent correcting magnetic field. It will be noted that the number of milliamperes required to show the magnetization state of the Ni-Fe-P storage film was different for each switching, the required milliamperes ranging from 400 to 800 milliamperes. On the other hand, curves 6 to 10, which essentially are one curve, were plotted during the switching of a cylindrical ferromagnetic film of the present invention comprising a 10,000 A. thick Ni-Fe-P storage layer 11 and a 20,000 A. thick Ni-Fe-Co-P biasing layer 13 having a coercive force of at least 2 oersteds higher than the coercive force of the Ni-Fe-P layer. It further will be noted that the slope of S-curves 1 to 5 of FIG. 3 do not approach the steepness of S-curves 6 to 10 of the present invention which are almost vertical. Those skilled in the art will recognize that this near vertical slope means the magnetization state of storage layer 11 of the ferromagnetic film 10 is switching by the desired and faster coherent rotation. Switching speeds of 2 nanoseconds thus are obtainable by the ferromagnetic film of the present invention. In contrast, the not-so-vertical slopes of S-curves 1 to 5 are indicative that incoherent rotation is influencing the switching of the storage film without a biasing layer and, hence, switching speeds of 2 nanoseconds are not obtainable.

According to another aspect of the present invention, the ferromagnetic film comprising a storage layer and a biasing layer is formed by a continuous plating process. While a continuous electroplating process may be employed, it is preferred to use electroless plating in which the plating process is based on controlled autocatalytic reduction by means of hypophosphite anions. In general, the electroless plating solution contains an alkaline aqueous solution of metal cations, for example $Ni^{++}$ and $Fe^{++}$ if a storage layer of this alloy is applied first, and hypophosphite anions. If the substrate 17 (FIG. 1), 27 (FIG. 2) is composed of copper, nickel, cobalt, iron, steel, aluminum, zinc, palladium, platinum, brass, manganese, chromium, molybdenum, tungsten, titanium, tin, silver, carbon, or graphite, and alloys containing any of these, the catalytic nature of these materials causes the reduction of the metal cations (viz. $Ni^{++}$ and $Fe^{++}$) to the metals-phosphorous alloys by the hypophosphite anions present. If the substrate is composed of glass or plastic, these materials are non-catalytic and should be sensitized by producing a film of one or more of the catalytic materials, such as palladium, on the substrate surface as is well known by those versed in the art. This is accomplished by a variety of known techniques. Preferably, non-catalytic substrates, such as glass, are used in the present invention.

When performing electroless plating of a storage layer of nickel and iron and a biasing layer of nickel, iron and cobalt in an alkaline solution, the presence of a compound forming water soluble nickel and a water soluble cobalt complexes is necessary in order to prevent precipitation of the nickel and cobalt as a hydroxide or hypophosphite. This is avoided with the addition of sufficient ammonia or ammonium salts to form the nickel and cobalt hexamine complex ions. To prevent the precipitation of the iron as ferrous ions, tartrate ions are added to keep the concentration of the ferrous ions below their solubility limit. Similarly, the activity of the hypophosphite ion is regulated by adjusting the free alkali content as measured by the hydroxyl ion content of the solution. This adjustment is done with the addition of sodium hydroxide, ammonium hydroxide, and other bases.

It will be recognized by those skilled in the art that other complexing or sequestering agents besides the ammonia and the tartrate ions are usable. These include organic complex forming agents containing one or more of the following functional groups: primary amino group ($NH_2$), secondary amino group (>NH) tertiary amino group (N—), imino group (=NH), carboxy group (—COOH), and hydroxy group (—OH). The preferred agents are potassium sodium tartrate, tartaric acid, ammonia, ammonium hydroxide, and ammonium chloride. Related polyamines and N-carboxymethyl derivatives thereof may also be used. Cyanides may not be employed since the plating process will not function in their presence.

The nickelous, cobaltous, and ferrous ions may be present in the form of any water soluble salt which is compatible with the plating process. These ions may be furnished in the form of chlorides, bromides, sulfates, acetates, sulfamates, tartrates, formates, nitrates, and mixtures thereof. Citrates also may be used but are the least desirable because the films plated from a solution containing citrates have poor mechanical properties.

Surface active substrates may be added such as sodium lauryl sulfate, as long as the substances do not interfere with the plating reaction. Exaltants also may be added to increase the rate of deposition by activating the hypophosphite anions such as succinic acid, adipic anions, alkali fluorides and other exaltants which are known to those in the art. Stabilizers may be added in minute concentrations such as 10 parts per billion. These may be stabilizers such as thiorea, sodium ethylxanthate, lead sulfate and the like. Also, pH regulators and buffers such as boric acid, disodium phosphate and others may be included in the solution.

To illustrate generally the continuous plating process of the present invention, the ferromagnetic film to be prepared is exemplified by the preferred Ni-Fe-P storage layer and the preferred Ni-Fe-Co-P biasing layer. The substrate, herein glass, first is properly prepared by mechanical and chemical cleaning according to standard practice of those skilled in the art. The cleaning should end with an alkali dip, such as in aqueous sodium hydroxide, and a water rinse.

Next, if it is desirable to sensitize the substrate prior to plating so as to increase the adhesion of the plate to the substrate, the preferred sensitizing procedure is disclosed fully in the Schmeckenbecher U.S. patent application Serial No. 162,897, filed Dec. 28, 1961, now abandoned, entitled "Electroless Plating of Magnetic Materials;" and assigned to the same assignee of the present application. For purposes of this illustration, this procedure is employed.

As mentioned previously, it is not critical which layer, i.e., the storage layer or the biasing layer, is deposited first. For purposes of this illustration, the storage layer, herein Ni-Fe-P, will be deposited first. Accordingly, the sensitized glass substrate is brought into contact with a plating solution containing $Ni^{++}$ and $Fe^{++}$ cations and hypophosphite anions. Any of the solutions disclosed in the Schmeckenbecher U.S. patent application Serial No. 162,894, filed December 28, 1961, now Patent No. 3,255,033 entitled "Electroless Plating of Magnetic Materials" and the Schmeckenbecher U.S. patent application Serial No. 353,849, filed March 23, 1964, entitled "Chemical Plating Solution, Process, and Product," both of which are assigned to the same assignee of the present application, may be used as the storage layer solution in the continuous process of the present invention. The storage layer solution is heated to the desired plating temperature while the solution is covered with an immiscible liquid inert to the solution and having a specific gravity of less than 1.0 to prevent, as much as possible, the oxidation of the ferrous ion to ferric ion, an undesirable ingredient in the solution, if it is present in concentrations of more than 400 mg./l. Silicone oil and xylene are examples of such a liquid. The sensitized substrate surface is maintained in contact with the plating solution until a Ni-Fe-P alloy of the desired composition and thickness is formed on the surface.

Since anisotropic properties are desired, the plating is performed in the presence of a magnetic field. If a suitable conductive wire, such as copper, is placed adjacent the substrate in the plating solution, 2 amperes of D.C. current on this wire will provide a magnetic field of about 13 oersteds which is sufficient to cause anisotropy in the plated storage layer. Magnetic fields of about 5 oersteds are permissible, but it is more desirable to have higher strength fields, such as 13 oersteds and above. Preferably, the wire or coil is arranged relative to the substrate so as to cause the easy axis of the storage layer to form normal to the longitudinal axis of the substrate.

Following this, the substrate with the storage layer plated thereon is brought into contact with a plating solution containing $Ni^{++}$, $Fe^{++}$, and $Co^{++}$ cations and hypophosphite anions. Again, the solution is heated to the desired plating temperature while it is covered with an immiscible liquid inert to the solution, such as silicone oil and xylene, to prevent oxidation of the ferrous ion to the ferric ion. The storage layer surface is maintained in contact with the plating solution until the Ni-Fe-Co alloy of the desired composition and thickness is achieved.

The biasing layer is to exhibit anisotropy so a magnetic field is present during plating of this layer. For this layer, since the direction of the magnetic field is to be such that the resultant easy axis is perpendicular to the easy axis of the storage layer, it is preferable to use a Helmholz coil which surrounds the vessel containing the plating solution. A magnetic field of about 25 oersteds from this coil has been suitable to cause anisotropy in the biasing layer. The coercive force of the biasing layer so formed should be within the range of 2.5 to 20 oersteds compared with 0.5 to 4 oersteds for the storage layer. With normal switching currents, a biasing layer with a coercive force of 2 oersteds higher than the storage layer is permissible, but a greater difference between the coercive forces of the two layers is desirable to insure that the biasing layer will be unaffected during switching of the storage layer. As is well known in the art, the condition of the surface being plated on influences the coercive force. That is, a relatively rough surface will cause the plated film to have a higher coercive force.

The electroless solutions utilized for plating the preferred storage layer (Ni-Fe-Co-P) are shown in the following charts which include as complexing agents, ammonium salt and tartaric salt. It will be noted that the other complexing agents are usable as heretofore discussed. It also is to be noted that the chart gives the concentration in moles/liter, as well as in grams/liter, of aqueous solution of each ion constituent present in solution for the biasing layer. In each instance, the minimum, preferred, and the maximum concentration for each ion constituent are given in tabluar form.

and 3.45 g./l. (0.0145 mole/liter) of nickelous chloride ($NiCl_2 \cdot 6H_2O$) was prepared. To this solution is added 13.8 g./l. (0.0695 mole/liter) of ferrous chloride ($FeCl_2 \cdot 4H_2O$). Then a 0.1% solution of palladium chloride ($PdCl_2$) was added to thus prepared solution until it constituted about 4.2% of the total solution. This amounted to about 0.34 g./l. After about 30 seconds, a 28% ammonium hydroxide solution is added until it constituted approximately 20.7% of the total solution. Into this prepared solution was dipped the rack carrying the 20 glass tubings. These glass substrates were left in the solution for 2 minutes at room temperature, after which they were taken out and rinsed with water.

Next, a storage layer solution containing 16.7 g./l. (0.157 mole/liter) of sodium hypophosphite ($NaH_2PO_2 \cdot H_2O$)

ELECTROLESS SOLUTION FOR STORAGE LAYER

| | Min. | Preferred | Max. |
|---|---|---|---|
| Nickelous ions, $Ni^{++}$ | 0.3 g./l. | 3.3 g./l. | 30.0 g./l. |
| Ferrous ions, $Fe^{++}$ | 0.1 g./l. | 1.1 g./l. | 10.0 g/l. |
| Nickelous to ferrous ion ratios, $Ni^{++}/Fe^{++}$ | 1.0 | 3.0 | 5.0. |
| Hypophosphite ions, $(H_2PO_2)^-$ | 2.0 g./l. | 3.5 g./l. | 7.0 g./l. |
| Tartrate ions, $(C_4H_4O_6)^=$ | 5.0 g./l. | 17.5 g./l. | 80.0 g./l. |
| Ammonium ions, $(N^+H_4)$ | 0.6 g./l. | 64.0 g./l. | 300.0 g./l. |
| pH | 8 | 11.5 | 13. |
| Temperature | 50° C | 75° C | 95°C. |
| Thickness of layer | 1,000 A | 10,000 A | 40,000 A. |
| Time | 5 min | 20 min | 40 min. |
| Plating rate | 150 A./min | 500 A./min | 1,500 A./min. |

ELECTROLESS SOLUTION FOR BIASING LAYER

| | Min. | Preferred | Max. |
|---|---|---|---|
| Nickelous ions, $Ni^{++}$ | 1.0 g./l.<br>(0.017 m./l.) | 4.8 g./l.<br>(0.08 m./l.) | 30.0 g./l.<br>(0.51 m./l.). |
| Ferrous ions, $Fe^{++}$ | 0.3 g./l.<br>(0.0054 m./l.) | 1.77 g./l.<br>(0.18 m./l.) | 10.0 g./l.<br>(0.317 m./l.). |
| Cobaltous ions, $Co^{++}$ | 0.8 g./l.<br>(0.0136 m./l.) | 1.6 g./l.<br>(0.27 m./l.) | 3.2 g./l.<br>(0.54 m./l.). |
| Nickelous to ferrous ion ratios | 1.0 | 2.8 | 6.0. |
| Nickelous to cobaltous ion ratios | 1.0 | 3.0 | 6.0. |
| Hypophosphite ions, $(H_2PO_2)^-$ | 2.0 g./l.<br>(0.03 m./l.) | 10.0 g./l.<br>(0.52 m./l.) | 15.0 g./l.<br>(0.228 m./l.). |
| Tartrate ions, $(C_4H_4O_6)^=$ | 6.0 g./l.<br>(0.04 m./l.) | 25.0 g./l.<br>(0.17 m./l.) | 40.0 g./l.<br>(0.27 m./l.). |
| Ammonium ions, $(NH_4)^+$ | 10.0 g./l.<br>(0.58 m./l.) | 71.0 g./l.<br>(4.17 m./l.) | 150.0 g./l.<br>(5.8 m./l.). |
| pH | 9.0 | 10.5 | 12.0. |
| Temperature | 55° C | 75° C | 99° C. |
| Thickness of layer | 5,000 A | 20,000 A | 80,000A. |
| Time | 10 min. | 40 min. | 80 min. |
| Plating rate | 150 A./min | 500 A./min | 1,500 A./min. |

With the electroless solution as heretofore described, a magnetic biasing alloy containing from 65 to 85 percent nickel, 1 to 20 percent by weight iron, 1 to 20 percent by weight cobalt, and 0.25 to 7 percent by weight phosphorous is provided. In utilizing the solution, it is preferred to regulate the cation constituents to provide an alloy containing from 77 to 85 percent nickel, 8 to 12 percent iron, 7 to 12 percent cobalt, and 0.5 to 3 percent phosphorous and most preferably consisting of 80 percent nickel, 10 percent iron, 9 percent cobalt and 1 percent phosphorous.

While the data of the above charts should offer sufficient teaching to one skilled in the art to practice the present invention, the following are examples of the electroless solution, the process of depositing the same, and the working conditions for the procedure which are given here by way of illustration and not as limitations.

EXAMPLE I

A rack carrying 20 pieces of glass tubing having 0.03 inch outer diameter and about 4 inches in length to be used as the substrates was placed in a vessel containing 400 g./l. (10 molar) cleaning solution of sodium hydroxide to prepare the glass substrates for plating. After about 30 minutes, the substrates were removed from the solution and rinsed with water. For forming a storage layer with anisotropic characteristics on each substrate, a length of #28 copper wire was passed through each of the glass tubings and connected to a D.C. power supply.

A sensitizing solution containing 17.2 g./l. (0.62 mole/liter) of sodium hypophosphite ($NaH_2PO_2 \cdot H_2O$)

50 g./l. (0.177 mole/liter) of Rochelle salt ($KNaC_4H_4O_6 \cdot 4H_2O$)

20 g./l. (0.084 mole/liter) of nickelous chloride ($NiCl_2 \cdot 6H_2O$)

and 6.5 g./l. (0.0327 mole/liter) of ferrous chloride ($FeCl_2 \cdot 4H_2O$) was prepared. To this solution was added a 28% ammonium hydroxide solution until it constituted approximately 20.06% of the total solution. The vessel containing the solution was placed in a water bath kept at 75° C. Silicone oil (G.E. SS97) having a specific gravity of 0.95 was added in an amount sufficient to coat the surface of the plating solution with a thin layer so as to protect the solution from the atmosphere. After about 30 seconds, the glass tubings which had been dipped in the palladium containing solution were dipped into this plating solution. The tubings were left in the plating solution for 10 minutes during which time 2.5 amperes current was carried on the #28 copper wire passing through each of the tubings. After this period of plating, they were removed from the solution and rinsed with water followed by a rinse with acetone.

A biasing layer solution containing 16.15 g./l. (0.52 mole/liter) of sodium hypophosphite ($NaH_2PO_2 \cdot H_2O$), 48.4 g./l. (0.171 mole/liter) of Rochelle salt ($KNaC_4H_4O_6 \cdot 4H_2O$)

19.4 g./l. (0.083 mole/liter) of nickelous chloride ($NiCl_2 \cdot 6H_2O$), 6.3 g./l. (0.0317 mole/liter) of ferrous chloride ($FeCl_2 \cdot 4H_2O$), and 6.45 g./l. (0.0271 mole/liter) of cobaltous chloride ($CoCl_2 \cdot 6H_2O$) was prepared. To this solution was added 28% ammonium hydroxide solution until it constituted 19.3% of the total solution. The vessel carrying the biasing layer solution was placed in a water bath kept at 75° C. Silicone oil (G.E. SS97) having a specific gravity of 0.95 was added in an amount to coat the surface of the plating solution to also protect it from the atmosphere. The rack carrying the tubings with the storage layer plated thereon was dipped into the biasing layer plating solution and are left in for 10 minutes. During this time, an uniform magnetic field of about 25 oersteds from a Helmholz coil surrounding the vessel was applied parallel to the axes of the tubing being plated. After the 10 minute plating period, the tubings were taken out of the solution, rinsed with water. Following this, the tubings were rinsed with acetone and dried.

This continuous process produced 20 cylindrical ferromagnetic films 10 of the present invention comprising approximately an 80.5 Ni-19 Fe-0.5 P storage layer and a 80 Ni-10 Fe-9 Co-1 P biasing layer, the easy axes of these two layers being normal to each other. Some properties of the films are as follows: (a) the thickness of the storage and biasing layers was found to be 8,000 A. and 10,000 A. respectively; (b) the coercive force ($H_c$) of the two layers differed by about 4 oersteds, the biasing layer, of course, having the higher coercive force; (c) the permanent correcting magnetic field of the biasing layer was less than 0.2 $H_k$. The cylindrical ferromagnetic films of Example I were tested for their use as memory elements and the orthogonal mode of switching was employed. S-curves 6 to 10 were plotted during the switching of one of the cylindrical ferromagnetic films of Example I. The rest of the ferromagnetic films yielded essentially the same curves as S-curves 6 to 10. As previously discussed, the S-curves 6 to 10 represent five separate switchings of the ferromagnetic film with a biasing layer. The steepness of the slope of the curves 6 to 10 is indicative of coherent rotation and, hence, switching times of around 2 nanoseconds. The consistency of the curves 6 to 10, i.e., they are substantially one curve, is indicative of the stability of the ferromagnetic film with a biasing layer.

EXAMPLE II

The procedure of paragraphs 1, 2, and 3 of Example I was followed. Then, the biasing layer solution of paragraph 5 of Example I was prepared and the sensitized glass tubings were dipped into the biasing layer solution for 10 minutes while an uniform magnetic field of about 25 oersteds produced by a Helmholz coil is applied parallel to the axes of the tubings. In other words, the procedure of paragraph 5 of Example I was followed.

Following the plating of the biasing layer, the solution and procedure of paragraph 4 of Example I were employed. The resultant ferromagnetic films comprised an inner biasing layer and an outer storage layer. The composition of these layers, their thickness, their coercive forces ($H_c$) and magnetic characteristics were essentially the same as the storage and biasing layers of the ferromagnetic films prepared under Example I.

To fabricate the ferromagnetic flat film of FIG. 2, the cleaning solution, the sensitizing solution, and the storage and biasing layers' solutions of Example I may be used. A glass substrate again is preferable, but the catalytic substrates mentioned previously may also be used. Because the film is flat, it is not convenient to attach a wire thereto for producing a magnetic field during plating. Thus, to cause anisotropy in the storage and biasing layers 21, 23 of FIG. 2, it is desirable to surround both vessels containing the plating solutions with Helmholz coils. With this arrangement, the longitudinal axes of the flat substrates are aligned parallel (or in the alternative, perpendicular) with the magnetic field during the plating of the storage layer 21. When the biasing layer 23 is plated, the longitudinal axes are oriented so that they are perpendicular (or in the alternative, parallel) to the magnetic field. Of course, it is understood that it does not matter which layer is plated first or during which plating the field is parallel to the longitudinal axes. As indicated in parentheses, an alternative procedure is possible. It is only necessary that the plated storage and biasing layers 21, 23 (FIG. 2) have easy axes normal to each other. Again, a magnetic field of 25 oersteds is sufficient.

Because thinner storage and biasing layers 21, 23 are preferred for the flat ferromagnetic film 20, the plating time and/or plating rate will be less than for the cylindrical layers 11, 13 of the ferromagnetic film 10. Preferably, the time and plating rate for the storage layer 21 and the biasing layer 23 are 2 minutes and 500A./min. and 4 minutes and 500 A./min., respectively. Otherwise, the process for making the flat ferromagnetic film 20 is essentially the same as making the cylindrical ferromagnetic film 10.

As mentioned previously, the continuous electroless plating process is preferred, but electroplating may be utilized to make the ferromagnetic films 10, 20 of the present invention. Since electroplating requires a conductive substrate or a conductive-substrate coating, a conductive metal layer, usually a gold layer of about 100 A., is applied by some suitable method, such as cathode sputtering, evaporating, or electroless plating, to the preferred glass substrate. If one of the conductive metals mentioned previously is used for the substrate, the application of this conductive layer, of course, is unnecessary.

For electroplating the cylindrical film 10 of FIG. 1, the electrolytic cell can be a cylindrical glass container having a cylindrical anode, such as a nickel sheet, closely fitted adjacent the inner surface of the container. The conductive coated cylindrical glass substrate serves as the cathode and is suspended vertically in the center of the cell from the shaft of an electric motor. The shaft rotates about 60 r.p.m. to cause sufficient agitation for uniform plating. Any constant current source known in the art which is capable of generating between 25 and 150 ma. of current may be used with the electrolytic cell. To provide a magnetic field during plating, a conductive wire is threaded through the cylindrical substrate and is connected to a suitable power source.

A suitable electrolyte for a Ni-Fe storage layer is an aqueous solution of nickel sulfamate ($Ni(NH_2SO_3)_2$), ferrous sulfamate ($Fe(NH_2SO_3)_2$), and boric acid ($H_3BO_3$). The ratio of nickelous ions to ferrous ions should be between 35:1 to 40:1 for the preferred 81 Ni-19 Fe alloy. To be within the preferred percentage range of 65–85% Ni and 15–35% iron, the ratio of Ni/Fe ions should be in the range of between 25:1 for the preferred maximum percent iron and 50:1 for the preferred minimum percent. The pH of the solution should be between 2 and 3.5 and may be adjusted and maintained by adding sulfamic acid ($H(NH_2SO_3)$). A stress-relieving agent, such as saccharin, may be added to the electrolyte, as well as a wetting agent. As is well known in the electro-chemical art, the composition of the plated film depends on the temperature of the electrolyte and the deposition potential. It has been found that ferromagnetic films with the desired magnetic characteristics are formed with a temperature range of 18° to 22° C. (room temperature) and at a deposition potential of 920 to 950 millivolts which can be monitored by any well-known means such as a saturated calomel reference electrode.

In plating the Ni-Fe storage layer (if that layer is to be deposited first), the substrate first is "struck" with a high current to plate an uniform layer of nickel. About 150 ma. for about 5 seconds is usually suitable for this purpose. The current then is reduced to around 25 ma. and the temperature is maintained at about 25° C., the pH at about 2.5, and the deposition potential at about 950 millivolts. A magnetic field of about 13 oersteds is produced by the wire threaded through the substrate to cause anisotropy of Ni-Fe film being plated. Using known techniques, the substrate is kept in the electrolyte until the desired thickness, preferably 10,000 A. is reached. After this thickness is plated, the substrate is removed and washed with water.

Next, the biasing layer, for example Ni-Fe-Co, is plated on the Ni-Fe plated substrate. An electrolytic cell substantially the same as the previous cell is employed except that a Helmholz coil surrounds the vessel for producing, during plating, a magnetic field parallel with the longitudinal axis of the substrate. To an electrolyte essentially the same as the Ni-Fe electrolyte is added cobalt sulfamate ($Co(NH_2SO_3)_2$) and this serves as the Ni-Fe-Co electrolyte. The nickelous ion to ferrous ion ratio now, however, should be in the range of 75–85:1 for the preferred 80 Ni-10 Fe-10 Co alloy. The nickelous ion to cobaltous ion ratio should also be in the range of 75–85:1 for this preferred alloy. Since Ni-Fe-Co composition can be in the range of 65–85% Ni, 1–20% Fe, and 5–20% Co, the Ni/Fe ratio can range from 40:1 to 800:1 and the Ni/Co ratio can range from 40:1 to 400:1.

The plating procedure of this biasing layer is the same as for the storage layer. It, however, is not necessary to "strike" the Ni-Fe plated substrate with a high current. Also, the plating time is longer and/or plating rate is higher because a thicker layer is desired, preferably 20,000 A. The coercive force of this layer is at least 2 oersteds higher than the storage layer and generates a permanent correcting magnetic field of less than 0.2 $H_k$.

For electroforming the flat film 20 of FIG. 2, the procedure for electroplating the cylindrical film is followed except for the following:

(a) A flat anode is used instead of the cylindrical one in the electrolytic cell. This anode is aligned parallel with the flat substrate, herein conductive metal coated glass, which preferably is suspended vertically in electrolytic solution so as not to trap gas bubbles;

(b) Two Helmholz coils are used, one surrounding the vessel containing storage layer solution and the other surrounding the vessel containing the biasing layer solution. Both coils generate about a 25 oersted magnetic field during plating for causing anisotropy in the storage and biasing layers; and (c) The vertically suspended flat substrate is rotated 90° about its horizontal axis after receiving the first plated layer so that the easy axes of the storage and biasing layers will be normal to each other. (It will be understood that if the substrate were horizontally suspended, it would be rotated 90° about its vertical axis.)

While the invention has been particularly shown and desribed with reference to preferred embodiments thereof, it will be understood by those skilled in the art that various changes in form and details may be made therein without departing from the spirit and scope of the invention.

What is claimed is:

1. In the method of forming a ferromagnetic film consisting of 65 to 85 percent by weight nickel, 1 to 20 percent by weight iron, 1 to 20 percent by weight cobalt and 0.25 to 7.00 percent by weight phosphorous, the step of contacting a catalytic surface with an electroless plating bath of:

1.0 to 30.0 grams per liter of nickelous ions,
0.3 to 10.0 grams per liter of ferrous ions, 0.8 to 3.2 grams per liter of cobaltous ions,
2.0 to 15.0 grams per liter of hypophosphite ions,
6.0 to 40.0 grams per liter of tartrate ions,
10.0 to 150.0 grams per liter of ammonium ions, and sufficient hydroxyl ions to maintain a pH of from 9 to 12 at a temperature of from 55° C. to 99° C.

2. In a method of forming a ferromagnetic film consisting of 80 percent by weight nickel, 10 percent by weight iron, 9 percent by weight cobalt and 1 percent by weight phosphorous, the step of contacting a catalytic surface with an electroless plating bath of:

4.8 grams per liter nickelous ions,
1.77 grams per liter ferrous ions,
1.6 grams per liter cobaltous ions,
10.0 grams per liter hypophosphite ions,
25.0 grams per liter tartrate ions,
71.0 grams per liter ammonium ions, and sufficient hydroxyl ions to maintain a pH of 10.5 at a temperature of 75° C.

3. In the method of making a plural layer ferromagnetic storage device having a film consisting of 65 to 85 percent by weight nickel, 1 to 20 percent by weight iron, 1 to 20 percent by weight cobalt and 0.25 to 7.00 percent by weight phosphorous, the step of contacting a surface of a layer comprising 65 to 85 percent by weight nickel and 15 to 35 percent by weight iron with a plating bath of:

1.0 to 30.0 grams per liter of nickelous ions,
0.3 to 10.0 grams per liter of ferrous ions,
0.8 to 3.2 grams per liter of cobaltous ions,
2.0 to 15.0 grams per liter of hypophosphite ions,
6.0 to 40.0 grams per liter of tartrate ions,
10.0 to 150.0 grams per liter of ammonium ions, and sufficient hydroxyl ions to maintain a pH of from 9 to 12 at a temperature of from 55° C. to 99° C.

4. In the method of making a plural layer ferromagnetic storage device having a film consisting of 80 percent by weight nickel, 10 percent by weight iron, 9 percent by weight cobalt and 1 percent by weight phosphorous, the step of contacting a surface of a layer comprising 65 to 85 percent by weight nickel and 15 to 35 percent by weight iron with an electroless plating bath of:

4.8 grams per liter nickelous ions,
1.77 grams per liter ferrous ions,
1.6 grams per liter cobaltous ions,
10.0 grams per liter hypophosphite ions,
25.0 grams per liter tartrate ions,
71.0 grams per liter ammonium ions, and sufficient hydroxyl ions to maintain a pH of 10.5 at a temperature of 75° C.

References Cited

UNITED STATES PATENTS

| | | | |
|---|---|---|---|
| 1,715,647 | 6/1929 | Elmen | 75—170 |
| 2,827,399 | 3/1958 | Eisenberg | 117—130 |
| 3,015,807 | 1/1962 | Pohm et al. | 340—174 |
| 3,125,745 | 3/1964 | Oakland | 340—174 |
| 3,179,928 | 4/1965 | Sorensen | 340—174 |
| 3,191,162 | 6/1965 | Davis | 340—174 |
| 3,213,431 | 10/1965 | Kolk et al. | 340—174 |
| 3,252,152 | 5/1966 | Davis et al. | 340—174 |
| 3,268,353 | 8/1966 | Melillo | 117—130 X |
| 3,278,914 | 10/1966 | Rashleigh et al. | 340—174 |

ALFRED L. LEAVITT, *Primary Examiner.*

J. H. NEWSOME, *Assistant Examiner.*